United States Patent [19]

De Groot et al.

[11] Patent Number: 4,944,092
[45] Date of Patent: Jul. 31, 1990

[54] DEVICE FOR CUTTING THE STALK OF A FLOWER OR PLANT

[75] Inventors: Franciscus J. De Groot, Laren; Jan W. De Swart, CL Maarsen; Jan Boerhoop, HP Woerden, all of Netherlands

[73] Assignee: Handelsvennootschap onder de firma Stengelbengel B.V., Maarssen, Netherlands

[21] Appl. No.: 312,168

[22] Filed: Feb. 21, 1989

[30] Foreign Application Priority Data

Feb. 22, 1988 [NL] Netherlands ............. 8800349

[51] Int. Cl.⁵ .............. B25F 3/00; B26B 1/06; B26B 3/00
[52] U.S. Cl. .................... 30/134; 30/124; 30/278
[58] Field of Search .......... 30/124, 134, 135, 278; 83/581; 251/9

[56] References Cited

U.S. PATENT DOCUMENTS

| | | | |
|---|---|---|---|
| 2,540,782 | 2/1951 | Hansen | 30/124 |
| 3,786,564 | 1/1974 | Acheson | 30/124 |
| 3,911,577 | 10/1975 | Nickel | 30/278 |
| 4,348,808 | 9/1982 | Nalbandyan | 30/134 |
| 4,348,832 | 9/1982 | Hauser | 47/1 R |
| 4,531,290 | 7/1985 | Plesa | 30/178 |
| 4,676,476 | 6/1987 | Herrli | 30/134 |

FOREIGN PATENT DOCUMENTS 2472912  7/1981  France .
 671852  5/1952  United Kingdom .

*Primary Examiner*—Douglas D. Watts
*Assistant Examiner*—Paul M. Heyrana, Sr.
*Attorney, Agent, or Firm*—Foley & Lardner, Schwartz, Jeffery, Schwaab, Mack, Blumenthal & Evans

[57] ABSTRACT

Device for cutting the stalk (22) of a flower or a plant, said device comprising two elements (1,2) being movable in respect of each other and being pressed away from each other by a spring (20) and being provided with cavities (9,25,14) which, in the most impressed position of the elements, are forming a bore in which a stalk (22) can be brought. The cavity (14) in said first elemnent (2) is having the shape of a support surface for a stalk (22), a knife (10) being provided in the cavity (9) of said second element (1) with which the stalk laid on the support surface of the first element (2) can be cut when the elements (1,2) are pressed towards each other.

8 Claims, 1 Drawing Sheet

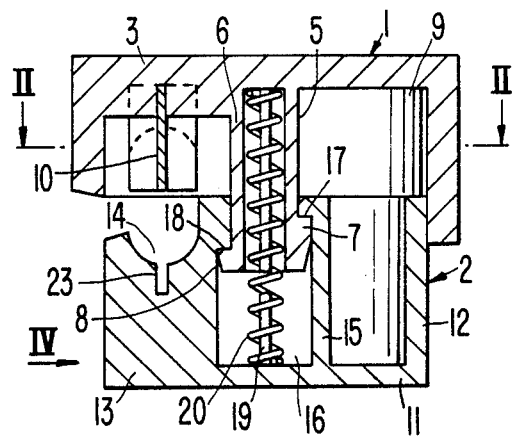
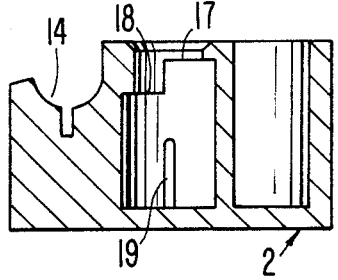
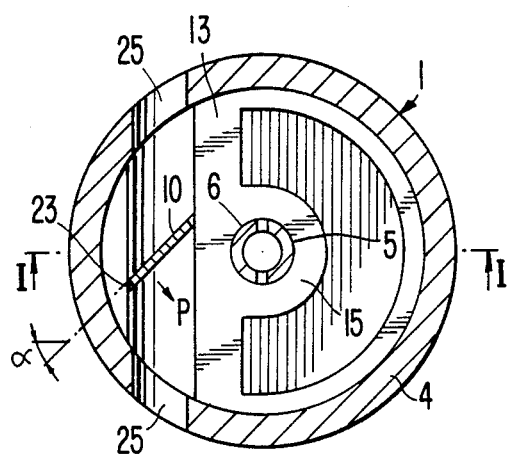
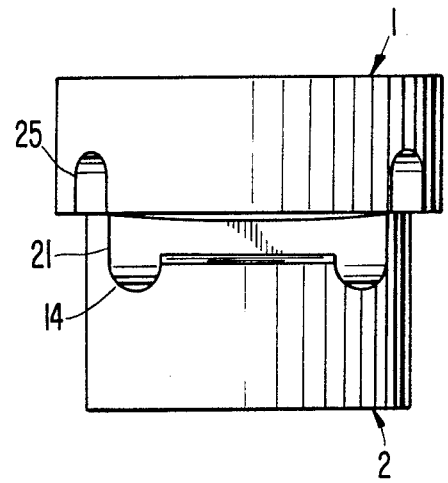
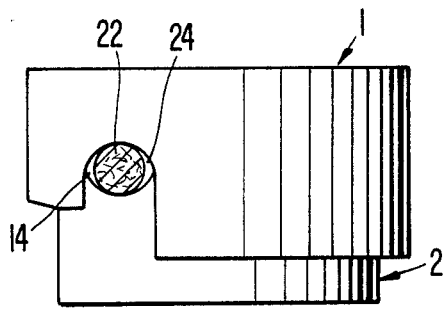

4,944,092

DEVICE FOR CUTTING THE STALK OF A FLOWER OR PLANT

The invention relates to a device for cutting the stalk of a flower or a plant. For cutting a stalk in most cases use is made of a knife, said stalk e.g. being pressed against the thumb of the hand by which the knife is operated or against another surface as e.g. a piece of wood or such like.

In the first case the user of the knife may harm himself while in the other case a suitable surface has to be looked for, which is not always present at once.

In connection with this the invention provides a device for cutting the stalk of a flower or a plant, said device comprising at least two elements being movable in respect of each other and being pressed away from each other by a resilient means till a portion of one of the elements is engaging an abutment connected to the other element, the portions of both elements which are slid into each other being provided with cavities which in the most impressed position of the elements are forming a bore running transverse to the direction of movement, in which bore a stalk can be present, the cavity in said first element having the shape of a hollow support surface for a stalk, a knife being provided in the cavity of said second element with which the stalk laid on the support surface of the first element can be cut when the elements are pressed towards each other, said cavities being shaped such that a sidewards directed receiving opening is present in the pressed apart position of both elements, via which opening a stalk can be sidewards brought onto the support surface of said first element.

So the device according to the invention is a combination of a cutting element in the shape of a knife with which the stalk can be cut and the support surface for the stalk to be cut. In consequence of the fact that the knife is positioned inside the cavity in the second element and the knife has to be pressed totally in the cavity of the first element before it can exert its cutting operation, it is prevented that one can hurt oneself with the knife.

To assure a good cutting of a stalk it can be provided, that in the bottom of the support surface a groove is provided in which the knife can be received when both elements are pressed towards each other.

So the knife can be brought till beyond the stalk to be cut, by which it is assured that all fibres of the stalk are cut.

Further the knife can make an acute angle with the center line of the cavity in a simple way by which it is obtained that the stalk is cut on the bias as this is generally recommended. In case of cutting the stalk on the bias a larger surface is obtained for having water and nutrient sucked in through the stalk, so that the stalk will have a longer life. Obviously it is much more difficult to cut a stalk on the bias by means of a knife.

In particular it can also be provided, that the cutting edge of the knife is making an acute angle with a plane transverse to the direction of movement of the knife. By this it is prevented that the stalk is compressed too much by the knife during cutting it.

According to an embodiment of the invention at least one of the elements will be made of synthetic material and both elements will be provided with means together forming a snap construction when the elements are mounted.

This gives a very simple mounting while the demounting of the elements is not or hardly possible. Also by this the safety of the device is advanced.

By having made at least one of the elements of synthetic material this element will automatically be sufficiently flexible for achieving the snap connection. Obviously also the other element can be made of synthetic material such as by applying a dye-casting method.

In particular the snap construction can be formed by two legs connected to the one element and extending in the direction in which both elements are moved in respect of each other, said legs being provided with outwardly extending hook shaped portions which may be received behind an inwardly directed shoulder extending from a mainly cylindrical wall connected to the other element, a compression spring being received inside said cylindrical wall and the spaced apart legs.

To prevent as much as possible that the device is used by little children, who perhaps might slid a finger in the opening, it can be provided that the elements are comprising such guiding means that after the elements are pressed towards each other over a given distance, the elements can be rotated in respect of each other and by this can be locked in respect of each other.

This may be obtained in a simple way because the hook shaped portions of both legs are spaced apart a given distance as seen in the longitudinal direction of said legs, the inwardly directed shoulder against which the hook shaped portions abut in the position of the use of the device being executed stepwise.

When now the elements are pressed towards each other over a given distance from the position in which they are pressed from each other as far as possible, they can be rotated in respect of each other by which the hooked shaped portion of one leg may come to lie below that portion of the inwardly directed shoulder against which first the hook shaped portion of the other leg was lying.

Obviously care will be taken that it is not possible to press the elements from this position further towards each other, because otherwise the knife might engage portions of said one element.

To bring the device again in the position of use, first both element will have to be rotated in respect of each other by which it is opposed that the device is used by little children.

The invention now will further be described by means of an embodiment shown in the drawing, in which:

FIG. 1 shows a vertical longitudinal section over a device according to the invention;

FIG. 2 shows a section according to the line II—II of FIG. 1;

FIG. 3 shows a section according to FIG. 1 but only of the lowest element in FIG. 1;

FIG. 4 shows a side view according to the arrow IV in FIG. 1; and

FIG. 5 shows a view of the device with the elements in the position in which they are slid into each other.

The device shown in the drawing consists of the two elements 1 and 2 being movable in respect of each other. The element 1 is formed by an end wall 3, a mainly cylindrical wall 4 extending from this up and two legs 5 and 6 being provided with the outwardly extending hook portions 7 and 8 respectively at the ends opposite the end wall 3.

By this a cavity 9 is obtained between the cylindrical wall 4 and the legs 5 and 6, a knife 10 being positioned in said cavity. Said knife 10 e.g. can be clamped in a groove being provided in the end wall 3.

The element 2 is formed by an end wall 11, a partly cylindrical wall 12 extending from this, and a solid wall portion 13 in which the cavity 14 is provided for receiving a stalk in it, which stalk has to be cut. Further a wall 15 is extending from the end wall 11, said wall joining the solid wall portion 13 so that a cavity 16 is formed. At the free end of the cavity 16 inwardly extending shoulders 17 and 18 are present, an inwardly extending lip 19 being provided at the other end of the cavity 16.

When mounting the elements 1 and 2 the legs 5 and 6 are slid in the cavity 16, during which the hook portions 7 and 8 can snap over the shoulders 17 and 18, so that the elements 1 and 2 are fixed in respect of each other. A spring 20 is provided in the cavity 16 and the space between the legs 5 and 6, said spring taking care for it that the element 1 and 2 are pressed away from each other.

The hook portions 7 and 8 and the shoulders 17 and 18 can be provided with oblique receiving portions to simplify the bringing of the element into each other. Eventually the leg 5 can be shorter than the leg 6 so that it is not necessary to press both legs at the same time towards each other when mounting the elements.

During the normal use of the device a stalk 22, see FIG. 5, is brought into the cavity 14 via the side opening 21, see FIG. 4. Now the elements 1 and 2 are pressed towards each other so that the stalk 22 can be cut by means of the knife 10. To take care for a good cutting the groove 23 is provided in the bottom of the cavity 14, in which the knife 10 can be received. In the most impressed position of the elements 1 and 2 the stalk 22 is present in the bore 24 which is formed by the cavity 14 on the one side and by two cavities 25 in the wall 4 on the other side.

It has to be remarked that when pressing the elements 1 and 2 towards each other they are guided because the legs 5 and 6 of the element 1 are coming to lie at both sides of the lip 19 in the cavity 16, so that also the knife 10 is guided in the right way to arrive in the groove 23.

As appears from FIG. 1 the cutting edge of the knife 10 makes an oblique angle with a plane extending transverse to the direction of movement of the knife, so that when the knife is moved the cutting edge first will engage a more sidewards lying portion of the stalk. By this the stalk will be compressed as less as possible during cutting it.

As in particular appears from FIG. 2 the knife 10 is making an angle $\alpha$ with the longitudinal direction of a stalk 22 to be cut so that the stalk is cut on the bias.

When the device need not be used anymore, the element 1 can be pressed towards the element 2 over a given distance, after which by rotating the elements in respect of each other the hook shaped portion 7 of the leg 5 can be brought below the shoulder 18, so that the elements 1 and 2 are locked in respect of each other and cannot be pressed away from each other by the spring 20.

In FIG. 2 the arrow P indicates the direction in which the knife 10 rotates when the elements 1 and 2 are rotated in respect of each other. By the oblique position of the knife 10 both ends of the knife are further moved away from the about vertical walls of the cavity 14 during said rotation, so that the rotation of both elements 1 and 2 in respect of each other does not give troubles also when the elements are pressed towards each other over a given distance. In a not given way the shoulders 17 and 18 will further run such that the elements can only be rotated in respect of each other in such a way that the knife 10 follows the arrow P in FIG. 2.

It will be obvious that only a possible embodiment of the device according to the invention is shown in the drawing and is described above and that many modifications can be applied without leaving the spirit of the invention.

We claim:

1. Device for cutting the stalk of a flower or plant, said device comprising:
   at least two elements which are movable with respect to each other and pressed away from each other by a resilient means until a portion of one of the elements engages an abutment connected to the other element;
   wherein the portions of both elements which are slid into each other being provided with cavities which, when the elements are pressed fully away from each other, form a bore running transverse to the direction of movement, said bore being adapted to receive a stalk;
   the cavity in said first element having the shape of a hollow support surface for the stalk;
   a knife being provided in the cavity of said second element, so that the stalk laid on the hollow support surface of the first element will be cut when the elements are pressed towards each other;
   said cavities being shaped such that a stalk-receiving opening is defined in the pressed-apart position of both elements through which opening a stalk can be brought onto the hollow support surface of said first element.

2. Device according to claim 1,
   wherein in the bottom of the support surface a groove is provided in which the knife can be received when both elements (1,2) are pressed towards each other.

3. Device according to claim 1,
   wherein the knife is making an acute angle ($\alpha$) with the center line of the cavity.

4. Device according to claim 1,
   wherein the cutting edge of the knife is making an acute angle with a plane transverse to the direction of movement of the knife.

5. Device according to claim 1,
   wherein at least one of the elements is made of synthetic material and both elements are provided with means together forming a snap construction when mounting the elements.

6. Device according to claim 5,
   wherein the snap constructions is formed by two legs connected to the one element (1) and extending in the direction in which both elements can be moved in respect of each other, said legs being provided with outwardly extending hook shaped portions which may be received behind inwardly directed shoulders extending from a mainly cylindrical wall connected to the other element, a compression spring being received inside said cylindrical wall and the spaced apart legs.

7. Device according to claim 6,
   wherein the hook shaped portions of both legs are spaced apart a given distance as seen in the longitudinal direction of said legs, the inwardly directed shoulder against which the hook shaped portions abut in the position of use of the device being staggered in the longitudinal direction.

8. Device according to claim 1, wherein the elements are comprising such guiding means that after the elements (1,2) are pressed towards each other over a given distance, the elements can be rotated in respect of each other and by this can be locked in respect of each other.

* * * * *